United States Patent [19]

Smith

[11] 4,057,654

[45] Nov. 8, 1977

[54] WHEAT-GERM PRODUCT AND ITS USE

[76] Inventor: Walton J. Smith, Rte. 4, Grafton, N.H. 03240

[21] Appl. No.: 633,784

[22] Filed: Nov. 20, 1975

Related U.S. Application Data

[63] Continuation of Ser. No. 460,386, April 12, 1974, abandoned.

[51] Int. Cl.² .......... A21D 2/38; A21D 10/00
[52] U.S. Cl. .................. 426/555; 426/618; 426/473; 426/653; 426/496; 426/497
[58] Field of Search .......... 426/618, 622, 653, 496, 426/473, 466, 554, 555

[56] References Cited

U.S. PATENT DOCUMENTS

| | | | |
|---|---|---|---|
| 2,085,421 | 6/1937 | Donk | 426/618 |
| 2,357,312 | 9/1944 | Cryns | 426/618 |
| 2,450,123 | 9/1948 | Cryns | 426/618 |

OTHER PUBLICATIONS

Hunter; B. T., The Natural Foods Cookbook, Simon and Schuster, N.Y., 1961, pp. 34, 320, 321.
Nichols; N. B., The Thrifty Cook, Doubleday and Co. Inc., New York, 1974, pp. 49 and 51.

*Primary Examiner*—Jeanette M. Hunter
*Attorney, Agent, or Firm*—Larson, Taylor and Hinds

[57] ABSTRACT

A method of using raw undefatted wheat germ by baking a mixture of raw wheat germ, flour, fat and soluble carbohydrate, grinding the baked product, mixing the ground product with a baking mix of flour and water to provide a batter and baking the batter to produce a final product.

4 Claims, No Drawings

WHEAT-GERM PRODUCT AND ITS USE

This is a continuation of application Ser. No. 460,386 filed Apr. 12, 1974, now abandoned.

This invention relates to products and processes involving the use of wheat germ in baked, eatable food products.

It is well known that there are two negative factors involved in the use of wheat germ in food products. One of these is the presence of ingredients including enzymes which alter the nature of the final product when combining wheat germ with flour. The other is the limited shelf life of products containing the whole wheat germ, in that they have a tendency toward rancidity and deterioration of flavor. In the past, this latter problem has to a great extent been "solved" by the defatting of the wheat germ, however, this robs the germ of one of its principal nutritious constituents, the wheat germ oil.

The former problem has been dealt with to some extent by other investigators by treating the wheat germ with steam and drying it in some cases at elevated temperatures, see for example, U.S. Pat. No. 3,036,919. Unfortunately, facilities of accomplishing this are not readily available in most factories involved in baking food products.

In addition to these two problems, although not stressed in the literature, the very unpleasant smell of raw wheat germ, especially in contact with water, lends an unpleasant odor to products containing it.

It is an object of this invention to provide an improved wheat germ product which is useful in ameliorating these disadvantages. Accordingly, the present invention provides a mixed wheat-germ product comprising by weight of the product from 20 to 60% raw wheat germ, from 10 to 40% flour, from 5 to 20% fat, and from 0 to 30% soluble carbohydrate.

Preferred proportions are from 30 to 45% wheat germ; from 15 to 25% flour; from 10 to 16% fat; from 5 to 15% soluble carbohydrate which can be sugar. A mixed product can include from 0 to 35% chopped or ground nuts, other flavorings and anti-oxidants.

From 0 to 20% water is used in the mixing process prior to baking, and the preferred proportions are from 5 to 10% water.

The invention also provides for the mixed product to be baked to provide a baked product, for the baked product to be ground and included in a conventional baking mix in a proportion of from 10 to 20% by weight and for said baking mix to be baked.

I have discovered that the intermediate product which is made with the whole wheat germ is useful in a variety of products as a dog treat, in granular form as a nutritional supplement or as a cookie, and as an ingredient in a wide variety of baked goods including biscuits, cookies, and bread.

I have found that if the whole germ is mixed in traditional mixers such as are found in biscuit factories with a small amount of fat, a small amount of sugar, and with a small amount of water, it forms a batter not unlike that used in making cookies and which may be formed in traditional rollers for making biscuits (cookies) or even using the wire-cut or other methods of forming, and then baking in ovens under conditions normally used for biscuits and cookies, resulting in an intermediate product which has a high degree of stability, with the unpleasant smell of the germ no longer present, the enzymes which interfere with baking are destroyed, yielding a low cost ingredient for a wide variety of baked products. This intermediate product I have termed a "Prebake" product. It may be stored for much longer periods than the original whole fresh germ and simplifies the purchase and storage of germ for optimum production of commercial products.

I have further discovered that I can produce an ingredient (Prebake) with a delicious nut-like taste and odor with even more applications if I include some chopped or ground peanuts (including peanut butter) in the above formula, accomplishing the roasting of the peanuts simultaneously with the baking of the high wheat germ product, which has all the applications of the general formula described above.

In commercial practice, the "Prebake" can be ground to the desired fineness and then used in this form in other baked goods such as cookies, bread, rolls, doughnuts, cakes, and cake mixes. While I have found that the "Prebake" is very stable, when desired, its stability may be enhanced still further by adding antioxidants such as are widely used in the art of preventing oxidation, including additional wheat germ oil or Vitamin E compounds.

The advantages of my invention provide the possibility of production within the same factory, not only of the "Prebake" but of biscuits and cookies and other baked products with a high percentage of wheat germ. Since, in many countries, it is the custom to eat white bread which does not contain the germ, I have devised biscuit and other products which can be used as treats and which in turn provide the quantity of germ which is normally missing from diets in which white bread is eaten. As an example, I have devised delicious biscuits (cookies) in which each cookie weighing a half-ounce provides the wheat germ equivalent of three thin slices of whole wheat bread. This has been made possible within the factory using traditional equipment available in such factories by the discoveries described herein.

Some detailed embodiments of the invention will now be described in the following, illustrative examples.

EXAMPLE 1

WHEAT GERM PREBAKE

The following ingredients are mixed in typical mixers used in factories making biscuits (cookies):

Vegetable Fat (27 pounds), Sugar (33 pounds), Water (27 pounds), Sodium Bicarbonate (1 pound), and Ammonium Bicarbonate (1 pound). These are mixed until uniform and then the following are added: Flour (44 pounds), Corn Starch (7 pounds), Fresh Wheat Germ (120 pounds). This is then mixed until uniform and cut in a rotary cutter and baked under usual conditions in continuous ovens providing a finished hard biscuit with a moisture content under 4% and preferably about 2%. The original odor of the wheat germ is lost in the baking process. For a slightly better tasting product, the Wheat Germ is reduced to 100 pounds and about 27 pounds of chopped cashews may be added to add flavor to the finished product.

EXAMPLE 2

PEANUT WHEAT GERM PREBAKE

The following are mixed in standard mixers which are used to make batter for making biscuits (cookies): Peanut Butter (107 pounds), Chopped Peanuts (107 pounds), Sugar (100 pounds), Water (80 pounds), Sodium Bicarbonate (4 pounds), Ammonium Bicarbonate (4 pounds). These are mixed until uniform and then the following are added: Flour (88 pounds) and Fresh Wheat Germ (200 pounds). These ingredients are mixed until uniform and cut as in Example 1 and baked under the same conditions as ordinary biscuits to obtain a moisture content of less than 4% and preferably about 2% or lower. It should be noted that the above Prebake has a protein content of about 20% and becomes an excellent source of protein as well as other nutrients found in wheat germ.

Wheat germ is a product of commerce and its composition is rather well understood. It is a byproduct of the production of white four. In some flour mills, the concentration of the germ is not so uniform as in other mills, and there is a varying degree of bran and even starch in the germ concentrate. For the purposes of this invention, any wheat germ concentrate can be used, and I have made the Prebake described in Examples 1 and 2 with Wheat Germ which has contained a substantial amount of bran, yet with a protein content of about 25%. In laboratory batches I have made the Prebake with a mill product known as "middlings", in which case the flour in making the Prebake may be reduced yet a very effective Prebake may be made by the general procedure outlined above.

EXAMPLE 3

PEANUT WHEAT GERM COOKIE

The Prebake from Example 2 is ground in a mill until moderately fine and is used in the following preparation: The following ingredients are mixed: Peanut Butter (70 pounds), Sugar (50 pounds), Light Brown Sugar (25 pounds), Sodium Bicarbonate (1½ pounds), Salt (1½ pounds), Ammonium Bicarbonate (½ pound), and Water (35 pounds). When uniform the following are added and further mixed until uniform: Flour (110 pounds) and Peanut Wheat Germ Prebake (Ground)(50 pounds).

The batter is cut using the wire cut method and baked in a standard oven. These cookies when weighing approximately ½ ounce contain approximately the wheat germ equivalent of three thin slices of whole wheat bread.

A wide variety of cookies has been made with the above Wheat Germ Prebakes, including chocolate chip, cocanut, chocolate, oatmeal, etc. The Prebake when ground has been used as an ingredient in cakes, muffins, doughnuts, pancakes, and other products. In granular form, the ground Prebake may be bottled and sold as a nutritious excellent-tasting food supplement.

The Prebake is made with other flavor ingredients than peanuts to obtain a group of nutritious supplements. The prebake in the form of cookies may be used as a nutritious supplement for both humans and animals.

I claim:

1. A method for the use of raw undefatted wheat germ in baked food products which comprises
   1. baking under conditions normally used for biscuits and cookies a batter comprising by weight of from 20 to 60% raw wheat germ, from 10 to 40% flour, from 5 to 20% added fat, from 6 to 30% soluble carbohydrate and 0 to 20% water to provide a finished prebaked intermediate product,
   2. grinding and mixing from 10 to 20% by weight of said finished prebaked intermediate product with a baking mix comprising flour and water to provide a second batter and
   3. baking said batter to provide a baked, undefatted wheat germ - containing food product.

2. The method of claim 1 wherein the soluble carbohydrate is sugar.

3. The method of claim 1 wherein the wheat germ content of said mixture is from 30 to 45%.

4. The method of claim 2 wherein the content of sugar is from 5 to 15%.

* * * * *